W. N. WHITELY & W. N. WHITELY, Jr.
MANURE SPREADER.
APPLICATION FILED OCT. 25, 1909.
982,330.
Patented Jan. 24, 1911.
5 SHEETS—SHEET 1.
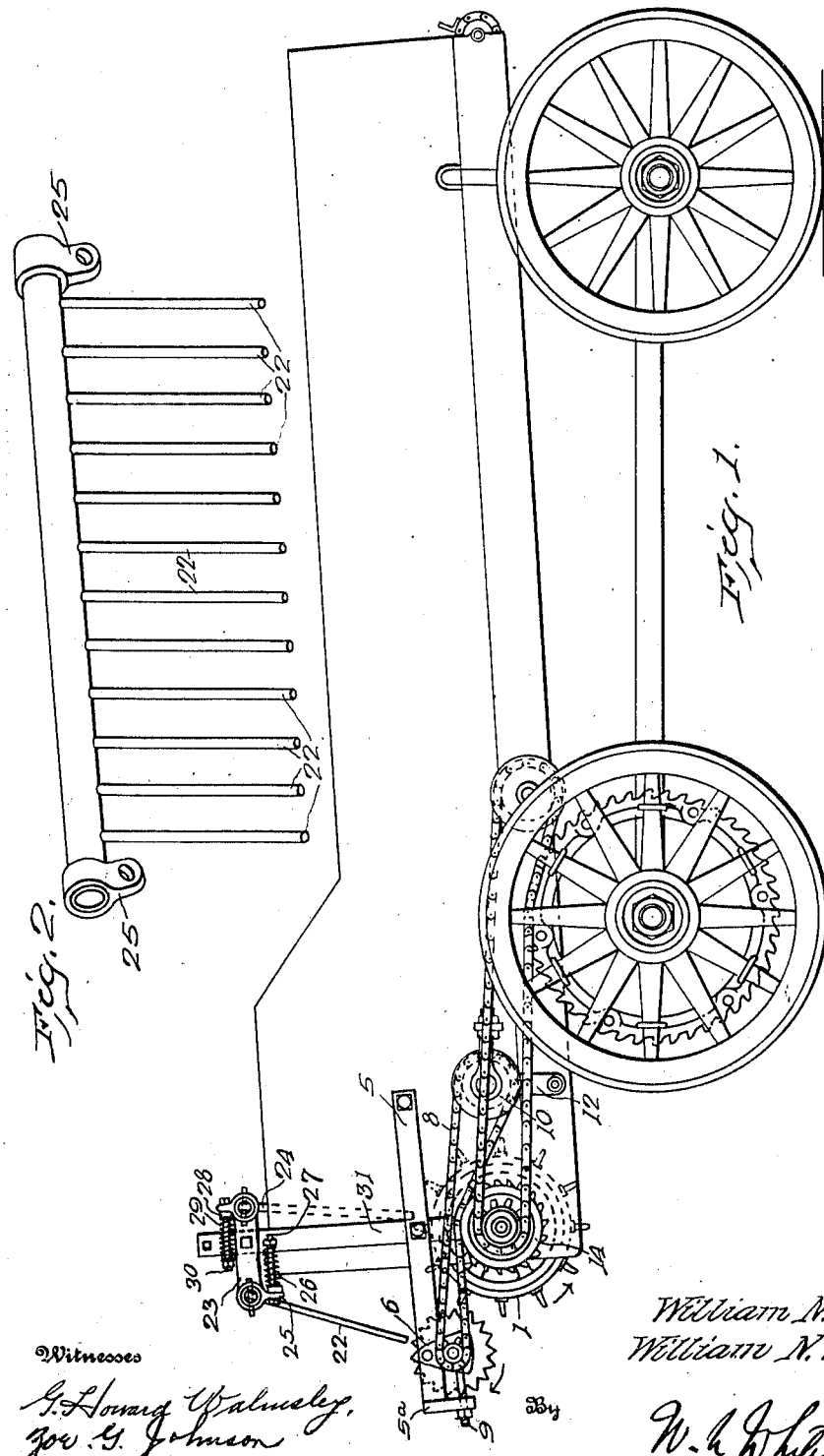

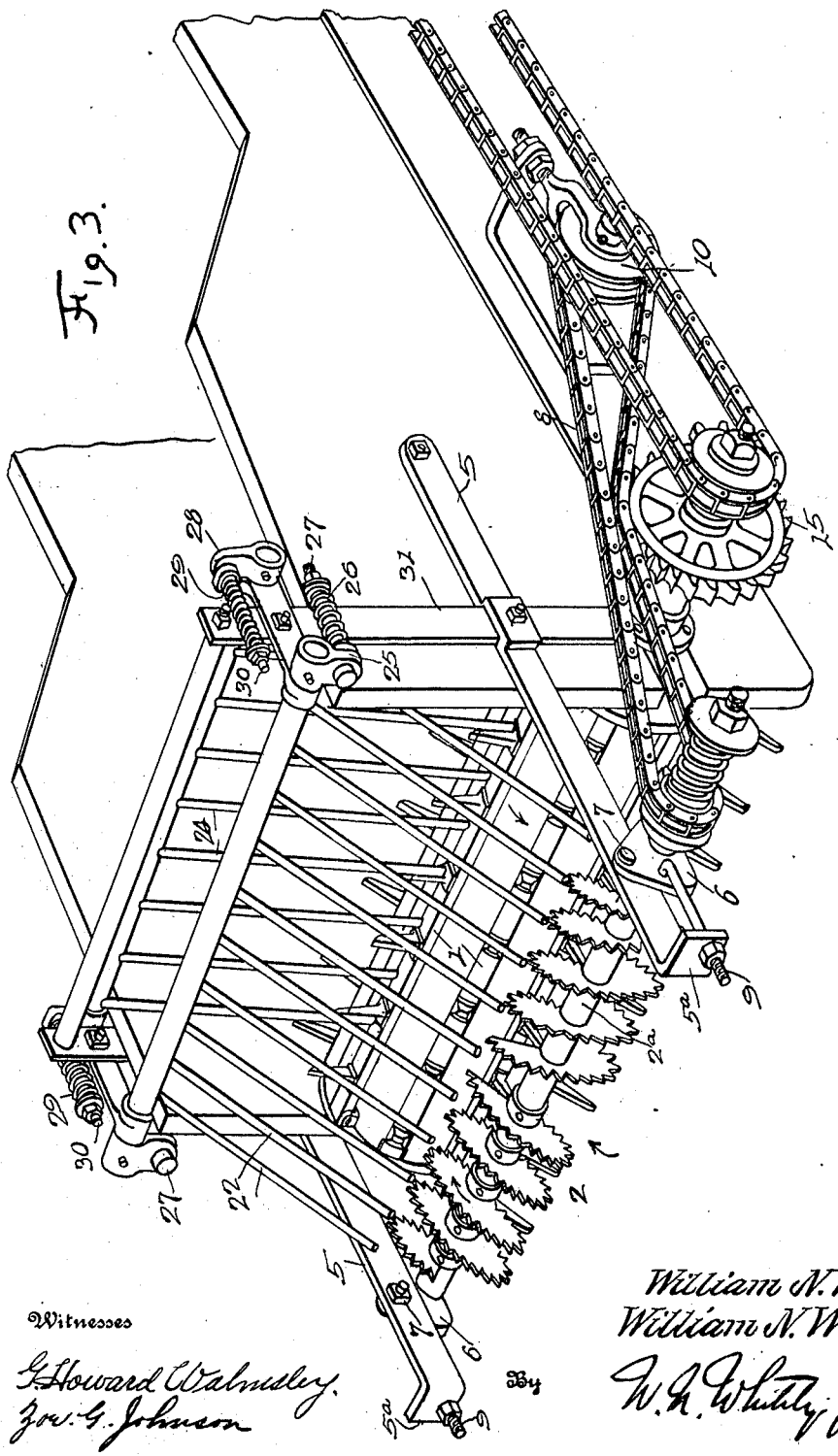

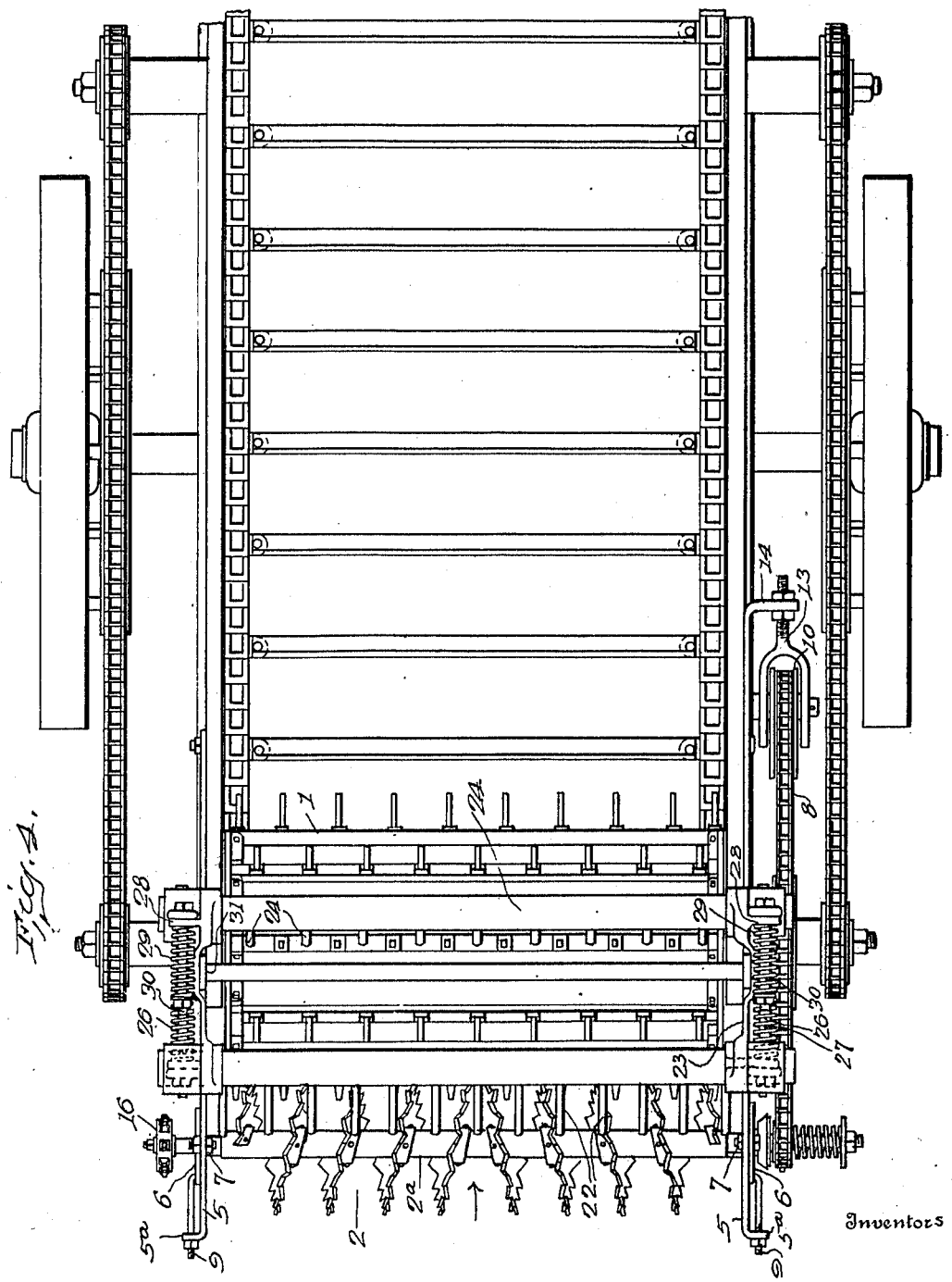

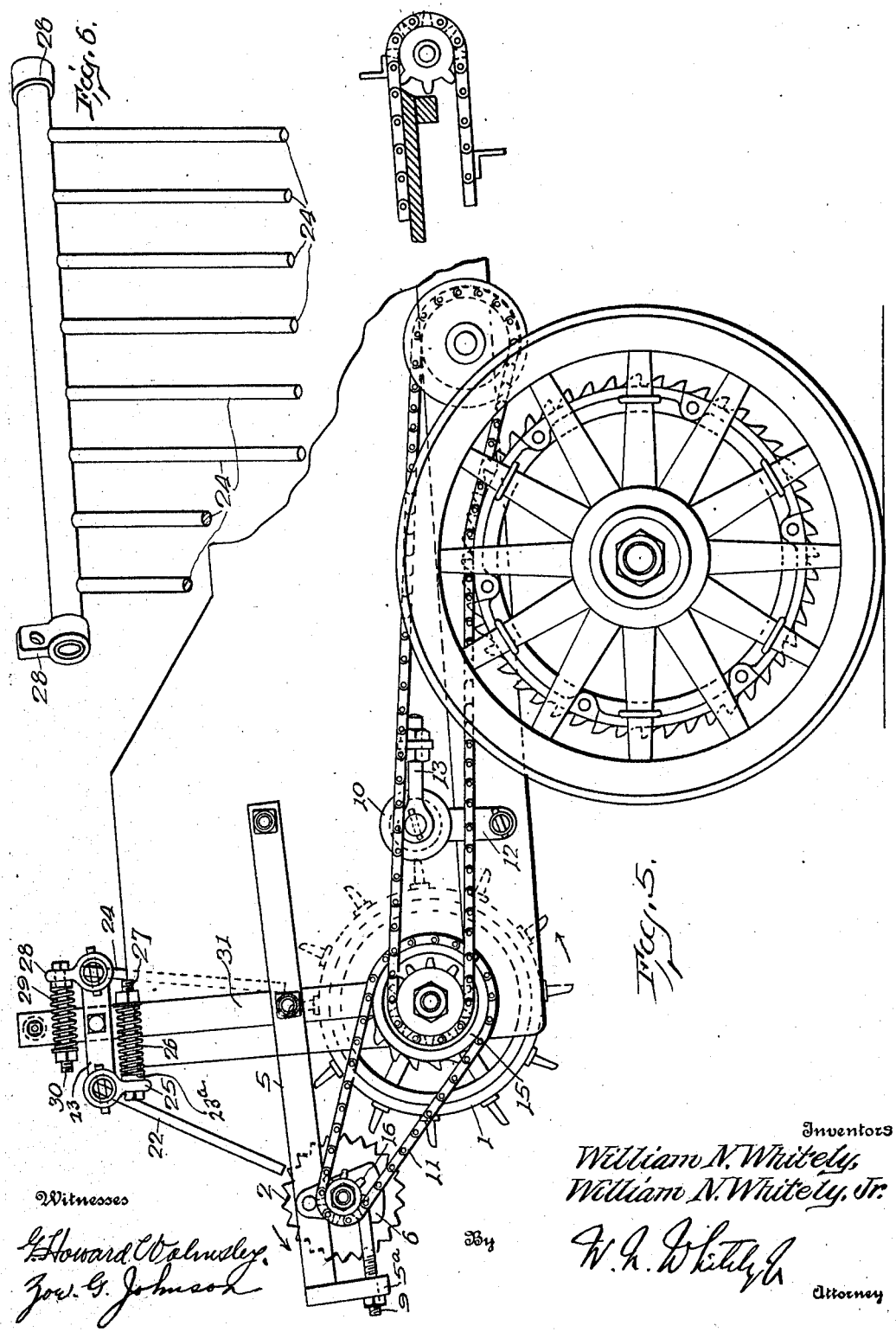

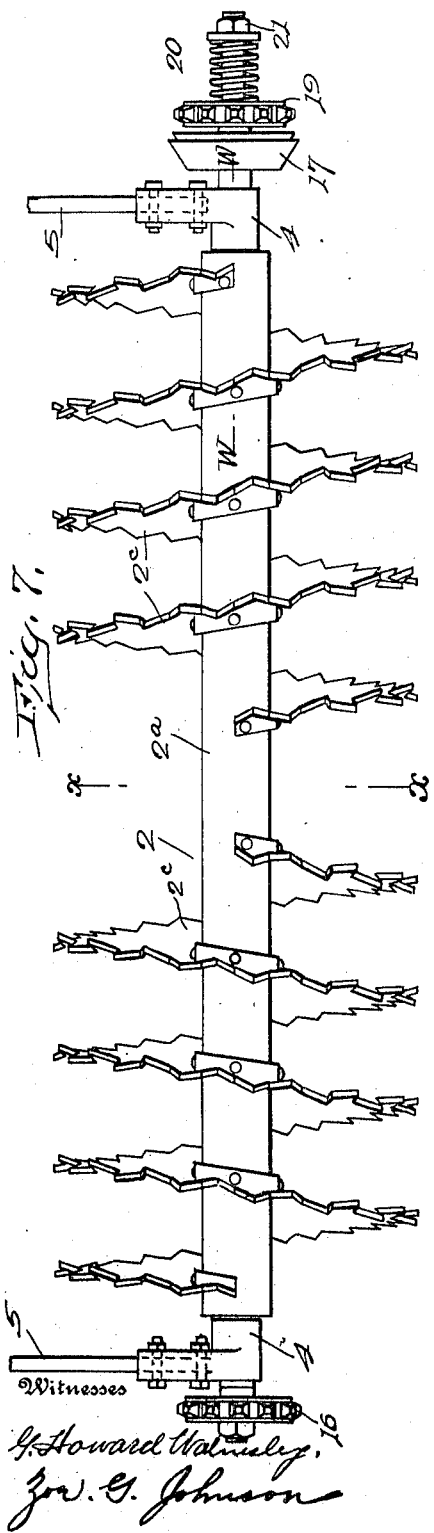
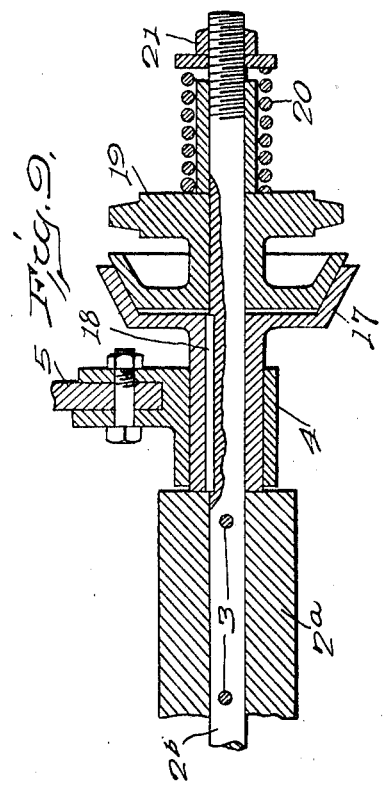
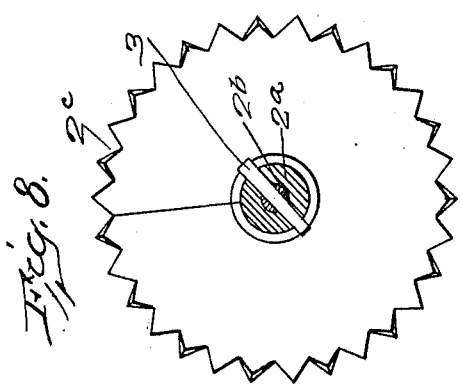

UNITED STATES PATENT OFFICE.

WILLIAM N. WHITELY AND WILLIAM N. WHITELY, JR., OF SPRINGFIELD, OHIO.

MANURE-SPREADER.

982,330.   Specification of Letters Patent.   Patented Jan. 24, 1911.

Application filed October 25, 1909. Serial No. 524,543.

*To all whom it may concern:*

Be it known that we, WILLIAM N. WHITELY and WILLIAM N. WHITELY, Jr., citizens of the United States, residing at Springfield, in the county of Clark and State of Ohio, have invented certain new and useful Improvements in Manure-Spreaders; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to improvements in manure spreaders.

The object of our invention is to finely pulverize and evenly distribute barn yard and stable manures and other kinds of fertilizers, in a swath much wider than the carrying bed. We have found that not only does the fertilizer go farther and benefit the land to a greater degree when so distributed, but that it is more convenient because it is not necessary to drive back and forth as many times as where the swath is narrow, and with a wider swath which reaches out beyond the track of the wheels it is unnecessary to lap back on the previous swath in order to make the edge of one swath meet another.

In the drawings: Figure 1. is a side view of the devices of our invention in connection with a spreader bed and running gear of the ordinary type. Fig. 2. is a perspective view of the detainer which is located over the secondary cylinder. Fig. 3. is a perspective rear view of our improvements. Fig. 4. is a plan view of the rear of a spreader showing the devices of our invention. Fig. 5. is an enlarged side view of our invention with the fore part of the bed broken away to show the manure conveyer belt. Fig. 6. is a perspective view of the rake or detainer used over the main or primary cylinder. Fig. 7. is an enlarged plan view of one form of the secondary cylinder. Fig. 8. is a cross section of Fig. 7 on lines X—X thereof. Fig. 9. is a transverse section of the secondary cylinder on lines $w$—$w$ of Fig. 7.

The running gear is of the usual type and need not be particularly described.

The manure conveyer shown is of the slatted link belt type but may be of any other well known form or construction. Preferably we employ a tight bottom body and a series of slats passing over same and propelled by a link belt on each side, what is commonly called a "straw carrier" kind conveyer. The manure conveyer may be driven at various speeds so as to distribute thick or thin swaths or any suitable amount. As such part of the machine is not included in our invention we have not shown any device for this purpose but any well known type of conveyer drive may be used.

The primary cylinder is of a well known type in general use but may be of any other suitable form or kind. The principal function of the primary cylinder is to discharge the manure from the bed as it is fed to it by the conveyer and secondarily to reduce or refine the manure or fertilizer as much as practicable without interfering with its main function.

The secondary cylinder 2. is preferably constructed with a central core $2^a$ and a shaft $2^b$ passes through the core $2^a$ and is fastened securely thereto by rivets 3. The shaft 3. bears in boxes 4. which are bolted to arms 5. Another kind of box is shown at 6. in Fig. 3. This bearing box 6. swings from a pivot 7. of the arm 5. and is adjusted to take up the slack of the driving chain 8. by means of a screw rod 9. which is pivotally secured to the box 6. and passes through an ear $5^a$ of the arm 5. at rear of said arm 5. A nut on the rear side of the ear $5^a$ serves to adjust the box 6. back and forth to obtain the right tautness of chain. When the chain 8. is adjusted by this means the adjustment of the idler 10. may be dispensed with and same constructed on a stationary spindle if desired in any well known way. If desired to run the secondary cylinder 2. in the same rotative direction as the primary cylinder 1. as shown by the arrows in Fig. 5., a chain 11. is employed, in which case the chain adjusting device described is employed. When this is done the manure will be carried over and to the rear of cylinder 2. Should the secondary cylinder 2. be rotated in the opposite direction from primary cylinder 1. only the idler 10. need be used to adjust the chain 8. and if so the box 6. may be replaced by the bearing box 4. which slips over the arms 5 and is bolted rigidly thereto as shown in Fig. 7. When the idler 10 is adjusted to take up chain slack it is loosely mounted on an arm 12. which is pivoted to the side of the bed and a divided pull rod 13. loosely fastens to arm 12. and passes through an ear 14. and is adjustably secured by a nut on each side of the ear 14. The chain 8. lies on top of the driving sprocket 15. to get the reverse direction of movement for secondary cylinder 2 from primary cylinder 1. while the chain 11. encircles the driver 15. to cause the secondary cylinder 2. to rotate in the same direction as primary cylinder 1. In practice it has been found preferable to rotate the two cylinders in opposite directions so as to tear up the manure by the grinding action resultant.

Preferably each series of blades $2^c$ are made in sections of malleable iron and the sections joined together so that their sides are continuous from about midway of the length of the cylinder to each end as shown in perspective in Fig. 3. The blades $2^c$ form screwlike surfaces to the right and left from about midway of the length of the cylinder 2. and are riveted or otherwise fastened to the core $2^a$. preferably as shown in Fig. 7. they have roughened edges consisting of staggered saw teeth by which the manure is reduced or cut up into small particles. The sides of the blades carry the manure out from the center and make a wide distribution or spread. These blades $2^c$ may be pitched at various angles from the longitudinal line of the bed, but we have found in practice that about 22 degrees pitch gives the best results.

When the secondary cylinder 2. is rotated in the same direction as primary cylinder 1. as indicated by the arrows in Fig. 5. the same is reversed, end for end, and the sprocket 16. used to drive it in connection with drive chain 11. and main drive sprocket 5. which serves equally well in use with either drive chain 8. or 11. This is done because if not reversed the swath would be narrowed instead of widened.

In Figs. 7 and 9. we show a friction drive device which may be employed to protect the machinery from injury when the two cylinders are rotated in opposite directions. It is preferable, and best results in refining the material to be worked on are obtained by locating the two cylinders so that their adjacent peripheries are close together. Occasionally an unbreakable foreign object, such as a stone or chunk of wood, may get into the load and on being discharged might injure the machinery if no protection were provided for. By means of this friction drive such danger is eliminated as the secondary cylinder 2. may stand still while the primary cylinder 1. continues to revolve so that any such piece lodging between the cylinders would cause no harm and could be removed by the operator and the devices resume their normal functions as before. To accomplish this we provide a driving disk 17, having a spindle end passing through the box 4. and snugly surrounding the shaft $2^b$ and keyed thereto by a key 18. which is partly seated in the shaft $2^b$ and disk 17. to hold the same together rigidly yet removably. The sprocket 19. has a disk-shaped portion to fit the taper of disk 17. and the sprocket 19. is tightly pressed against said disk 17. by means of a coil spring 20. fitting over the shaft $2^b$. and adjusted to the proper tension by a nut 21. By this means the sprocket 19. may keep on rotating and yet the secondary cylinder 2. stand still.

When the secondary cylinder 2. is rotated in the same direction as primary cylinder 1. it is not so important to provide a safety device as just described because any foreign objects will be carried off over the secondary cylinder 2. and same can be discharged through the secondary detainer 22. onto the ground, without damage to the machinery, by reason of its spring action. When the secondary cylinder is so rotated it will grind the manure against the secondary detainer 22. to get the second refining action necessary.

It has been found in practice that the primary cylinder cannot acceptably sacrifice its main function of discharging the fertilizer from the bed for that of refining the manure. As it cannot adequately do both of these things a secondary cylinder is provided to thoroughly refine the materials by a second refining process and to distribute and spread it in an even and wide swath. Commonly in manure spreaders now on the market the manure must be loaded evenly and uniformly and little, if any, height above the top of the sides of the bed. Ordinarily if the manure is heaped up high or loaded irregularly the result is that it is thrown off in chunks or bunches and thicker in the middle of the swath than at the edges so that the machine must be driven back over part of the swath (what is called "lapping back") to make the edges meet. By means of the secondary cylinder 2. these difficulties and objections are overcome and the same amount of manure made to cover a greater area, and the load can be piled up high so that a smaller and narrower bed will carry as much as the very wide beds commonly used, and a wider and more uniform spread made at the same time.

We have stated that the edges of the blades of the secondary cylinder 2. are roughened or serrated and that the blades extend in screwlike form to right and left from about the center of its length; it is obvious that changes may be made in said cylinder's form and construction, and any suitable sort of projections, such as are well known in the art, may be employed as will accomplish these results, and a secondary cylinder not of the particular construction may be used in connection with a rake or detainer over it, so that there are two cylinders, one in the rear of the other, and both coöperating with detainer mechanism. In order to thoroughly accomplish the foregoing objects and to cause both of said cylinders to operate and perform their respective functions most efficiently, we preferably provide detainer mechanism to control and hold the material to be acted upon so that it is directed and forced on to each cylinder and onto both jointly so that every particle of manure is beaten and torn up and deposited evenly and uniformly and none gets away from this action. While any type of detainer or any device coöperating with the primary cylinder 1, whether it be stationary or otherwise may be used yet it will be understood that the functions of the primary cylinder are principally of a discharging nature, and the main work of this integration and distribution reside in the functions of the secondary cylinder 2 and secondary detainer 22. The result is that the land is effectively treated, and that a minimum amount of manure will be needed to cover a given area.

The secondary detainer 22. is preferably composed of a plurality of teeth of spring steel so spaced that the manure is forced down on the secondary cylinder 2. as it is discharged by the primary cylinder 1. and cannot shoot over or above the said cylinder 2. or get away from it without being refined and evenly spread. The detainer 22. may be a board if desired. The secondary cylinder 2. can also be of small diameter when protected by the detainer. The speed of the secondary cylinder should, and by the driving mechanism shown does, exceed that of the primary cylinder 1. The head of the secondary detainer 22. is preferably tubular and preferably is pivoted in a bracket 23. which also forms the bearing for the primary detainer 24. Preferably the secondary detainer 22. is pivoted so that if it is desired to rotate the secondary cylinder 2. in the same direction as primary cylinder 1. that it can spring back to let any foreign object pass over and away from the secondary cylinder 2. without damage to the parts, (but when the secondary cylinder 2. rotates in the opposite direction to the primary cylinder 2. the detainer 22. may be rigid.) This is accomplished as shown in Fig. 5 by means of a lug 25. pinned to the head of the secondary detainer 22. and bearing against an ear 23ᵃ of the bracket 23. which holds said secondary detainer in normal position against the pull of a spring 2ᵇ interposed between said bracket 23. and a nut on a spring rod 27. which passes through said lug 25. and has its head resting against same and by means of said nut the tension of the detainer 22. is regulated so that manure cannot carry it out of a normal position. The same kind of devices regulate the primary detainer 24. which coöperates with primary cylinder 1. for the same purpose except that the tension of the primary detainer 24. preferably should not be as great as the secondary detainer 22. because if it were great enough to stop the passage of a chunk of refractory manure the main cylinder would choke by reason of interrupting the constant solid flow while trying to disintegrate the chunk. This reducing process must be left to the secondary cylinder very largely or else, as practice has shown, a stiff detainer over the primary cylinder would cause interminable choking.

The tension devices of the main detainer 24. are as follows:—28. represents the lug fastened to the head, 29. the spring for same and 30. the spring rod. The bracket 23. also supports the head of the primary detainer 24. An upright arm 31. secured to the side of the bed holds the bracket 23. in place.

The main drive chains and other primary power transmitting and equalizing mechanisms may be of any well known type not necessary to be described here, nor need be described the levers or other regulating devices operated by the driver.

We claim:—

1. In a manure spreader construction in combination, a body, means within said body to move the manure dischargeward, a primary rotating manure pulverizing and discharging cylinder located at the manure discharge end of said body, a manure detainer located over said primary cylinder, a secondary rotating manure pulverizing and spreading cylinder located distant from the load of manure in said body and in close proximity to said primary cylinder on the manure discharge side thereof, a manure detainer located over said secondary cylinder, said secondary cylinder and said manure detainer forming a receptacle into which the loose manure is discharged by said primary cylinder and means connected with said secondary cylinder whereby the manure is refined and spread evenly over the ground.

2. In a manure spreader construction, a body, means within said body to move the manure. dischargeward, a primary rotating manure pulverizing and discharging cylinder provided with teeth around its periphery located at the manure discharge end of said body, a manure detainer located over said primary cylinder, a secondary manure pulverizing and spreading cylinder located on the manure discharge side of said primary cylinder, right and left hand screw blades parting about the middle of the length of said secondary cylinder, a manure detainer located over said secondary cylinder and means for rotating said primary and secondary cylinders.

3. In a manure spreader construction in combination, a body, means to move the manure dischargeward in said body, a primary rotating manure pulverizing and discharging cylinder, a manure detainer coöperating with said cylinder, a secondary rotating manure pulverizing and spreading cylinder located distant from the load of manure in said body and in close proximity to said primary cylinder on the manure discharge side thereof, a manure detainer located over said secondary cylinder, said secondary cylinder and said manure detainer forming a receptacle into which the loose manure is discharged by said primary cylinder, means connected with said secondary cylinder whereby the manure is refined and spread evenly in a wide swath over the ground and means for rotating said primary cylinder and said secondary cylinder in opposite directions.

4. In a manure spreader construction in combination, a body, means to move the manure dischargeward in said body, a primary rotating manure pulverizing and discharging cylinder, a manure detainer coöperating with said cylinder, a secondary rotating manure pulverizing and spreading cylinder located on the manure discharge side of said primary cylinder, means for rotating said secondary cylinder in an opposite direction to said primary cylinder, a manure detainer located over said secondary cylinder, said secondary cylinder comprising right and left hand screw-blades, said blades dividing about midway of the length of said secondary cylinder.

5. In a manure spreader construction in combination, a body, means within said body to move the manure dischargeward, a primary rotating pulverizing and discharging cylinder located at the manure discharge end of said body, a manure detainer located over said cylinder, a secondary rotating manure pulverizing and spreading cylinder located on the manure discharge side of said primary cylinder and in proximity thereto said secondary cylinder rotating in an opposite direction to said primary cylinder, comprising a right and left hand screw blade, said blades divided about midway of the length of said secondary cylinder and provided with teeth on their outer periphery to act saw-like against the manure to fine it, the body of said screw blades acting to force the manure sidewise into a wide swath over the ground.

6. In a manure spreader construction in combination, a body, means to move the manure dischargeward in said body, a primary rotating manure pulverizing and discharging cylinder, a secondary rotating manure pulverizing and spreading cylinder located on the manure discharge side of said primary cylinder, friction drive mechanism comprising a driving chain from the shaft of said primary cylinder to the shaft of the said secondary cylinder for rotating said secondary cylinder in an opposite direction to that of said primary cylinder, and a friction drive sprocket from which said secondary cylinder receives power.

7. In a manure spreader construction in combination, a body, means to move the manure dischargeward in said body, a primary rotating manure pulverizing and discharging cylinder, a manure detainer coöperating with said cylinder, a secondary rotating manure pulverizing and spreading cylinder located on the manure discharge side of said primary cylinder and frictional drive means for rotating said secondary cylinder in an opposite direction to that of said primary cylinder, one member of said frictional drive means comprising a tooth gear or sprocket having frictional engagement with one of the shafts of one of said cylinders.

8. In a manure spreader construction in combination, a body, means to move the manure dischargeward in said body, a primary rotating manure pulverizing and discharging cylinder, a manure detainer coöperating with said cylinder, a secondary rotating manure pulverizing and spreading cylinder located on the manure discharge side of said primary cylinder, arms extending back from the sides of said body, bearing boxes for the shaft of said secondary cylinder adjustably secured to said arms and means to adjust and hold said bearing boxes in the adjusted position.

In testimony whereof, we affix our signatures, in presence of two witnesses.

WILLIAM N. WHITELY.
WILLIAM N. WHITELY, Jr.

Witnesses:
R. A. GARLOUGH,
J. M. OLINGER.